United States Patent [19]
Radobenko

[11] 3,762,015
[45] Oct. 2, 1973

[54] DIE BONDER APPARATUS

[75] Inventor: William Radobenko, Scottsdale, Ariz.

[73] Assignee: Automated Equipment Corp., Phoenix, Ariz.

[22] Filed: Jan. 17, 1972

[21] Appl. No.: 218,135

[52] U.S. Cl. ........... 29/203 V, 214/1 BB, 214/1 BT, 221/211
[51] Int. Cl. .......................................... H05k 13/00
[58] Field of Search ............ 214/1 BB, 1 BT, 1 BD; 29/203, 208 R; 221/211

[56] References Cited
UNITED STATES PATENTS

| | | | |
|---|---|---|---|
| 2,948,417 | 8/1960 | Haanes | 214/1 BD |
| 3,575,301 | 4/1971 | Panissidi | 214/1 BC |
| 3,479,716 | 11/1969 | Zanger | 214/1 BT |

Primary Examiner—Gerald M. Forlenza
Assistant Examiner—George F. Abraham
Attorney—Roland I. Griffin

[57] ABSTRACT

A high speed, reliable die bonder is provided for picking up dice from a loading position and transporting them to a bonding position and for thermocompression bonding the dice to a transistor strip. A low-inertia, straight-line reciprocating ram mechanism operated by a modified sine-curve, motor-driven cam serves as the transport mechanism. Apparatus driven from the cam lifts and lowers the die pick-up mechanism, which is mounted on the ram mechanism. The transistor strip is indexed with the ram mechamism to synchronize the transistor strip with the die pick-up and die bonding. An oscillatory die transport head synchronized with the ram mechanism serves to scrub each die at the bonding position to provide an enhanced bond.

4 Claims, 14 Drawing Figures

DIE BONDER APPARATUS

CROSS-REFERENCE TO RELATED APPLICATION

This application is related to U.S. Pat. application Ser. No. 39,403 entitled DIE BONDER APPARATUS, filed on May 21, 1970, by William Radobenko, issued on Oct. 3, 1972, as U.S. Pat. No. 3,695,501, and assigned to the same assignee as the present application.

BACKGROUND OF THE INVENTION

Semi-automatic die bonders are presently in use for bonding transistor circuit dice onto transistor strips by the application of heat and pressure. These die bonders perform the steps of picking up a single die at a loading position, moving the die to a bonding position, bonding the die onto a transistor, strip, and returning to the loading position to pick up the next die. Since the dice are extremely small and must be accurately positioned and aligned on a small transistor strip (or other element), die bonders must have accurately controlled movements. In addition, they must transport the dice as rapidly as possible. Die bonders heretofore available are typically only capable of producing die bonds at a rate of about 1800 dice per hour, sequentially bonding one hundred dice onto each transistor strip, one transistor strip after the other. Moreover, they utilize high-inertia motions resulting in slow performance and high maintenance costs.

While some dice of a selected size and eutectic material may be adequately bonded by pressure and heat alone, certain other dice, especially dice with a relatively large surface area, require a scrubbing action against the bonding pad for optimum bonding. Such a scrubbing action when done manually is poorly regulated and time consuming.

SUMMARY OF THE PRESENT INVENTION

It is the principal object of the present invention to provide an improved, accurate, low-inertia, higher speed, and more reliable semi-automatic die bonder with provision for automatically scrubbing each die at the bonding position for an adjustable period of time to improve the bond. This improved die bonder sharply reduces the maintenance problems normally encountered with existing die bonders and will produce on the order of 6,000 to 7,200 accurate and reliable die bonds per hour. It employs a fast, precise linear drive motion to transport the individual die from the loading position to the bonding position. The transistor strips (or other elements) are fed in automatic indexing fashion to the bonding position, each transistor strip in turn being indexed into position for the attachment of each individual die.

Other and incidental objects of this invention will become apparent from a reading of this specification and an inspection of the accompanying drawings.

In accordance with the illustrated preferred embodiment of this invention, the improved die bonder comprises a reciprocating ram mechanism operated by a motor-driven cam and provided with a spring-loaded, floating vacuum quill for picking up and holding a die while the die is transported from the loading position to the bonding position. The reciprocating ram mechanism employs a ram arm having a low-inertia, dual, straightline modified Scott-Russel motion with a precise linear stroke of, for example, 4½ inches within ±0.002, obtained through a suitable amplification ratio of, for example, 8:1. The ram arm carries a spring-loaded push rod, which is coupled at its outer end to a bell crank pivotally connected to an oscillatory housing for the floating vacuum quill. This housing is suspended from the outer end of the ram arm by a pair of leaf springs or reeds. A motor-driven cam operates the push rod, through an oscillating cam-follower and two trip dogs coupled to push rod and pivotally mounted on the ram arm, at the period in time when the vacuum quill is over the loading position to lower and raise the vacuum quill to pick up a die and at the period in time when the vacuum quill is over the bonding position to again lower and raise the vacuum quill to deposit the die on a transistor strip (or other element). In order to attain functional symmetry with the least functional disturbance, a modified sine-curve cam with higher harmonics eliminated is employed. The oscillating cam-follower, which serves to drive the ram mechanism through an oscillating link, utilizes a double roller, one smaller diameter roller and one larger diameter roller on a common eccentric roller pin. The motor-driven cam has a groove with conjugate upper and offset lower tracks, which allow the smaller diameter roller to contact the upper track and the larger diameter roller to contact the offset lower track, thereby providing positive tracking for both rollers. The conjugate-track cam, double-roller follower, and the oscillating link form a rigid mechanism for amplifying and imparting linear motion to the ram mechanism. The oscillating cam-follower combines with the linear-motion ram mechanism to form a very low torque, low-inertia reciprocating mechanism.

The transistor strip is indexed by a mechanism including two sets of rollers, each set including a motor-driven drive roller and a pressure or nip roller that serves to push the transistor strip against the drive rollers. The drive rollers are driven from a stepping motor pulsed from a photo-electric pulse control mounted on 2 drive shaft for the cam. A fiber optics strip sensor and hole sensor mounted on the indexing mechanism are utilized to sense the presence of the transistor strip and the presence of an indexing hole in the transistor strip. When the stepping motor is pulsed to move the transistor strip one step between bondings, the applied pulse is on only long enough to move the indexing hole from alignment with the hole sensor, a light source and photocell then serving to continue the motor drive until the hole sensor senses the next indexing hole. Thus, the indexing mechanism is independent of the constant drive factor, which occurs with the use of strip sprockets, cog wheels, etc. A vertically movable strip locator and clamp positioned near the bonding position allows the nip rollers to be released as it moves downward, thereby allowing the transistor strip to float before locating pins enter indexing holes for positive positioning. A heater unit heats the transistor strip during the bonding and indexing cycle, bringing the transistor strip from ambient temperature to a bonding temperature of 435°C to 500°C within five seconds.

A drive mechanism is provided for operating the oscillatory vacuum quill housing in an oscillatory motion while the quill is at the bonding position to scrub the die against the bonding surface, thereby enhancing the bonding action. If a time period of scrubbing is desired which is longer than the normal dwell time of the quill at the bonding position, a settable timer may be utilized to increase the dwell time of the quill at the bonding position and thereby allow for an extended scrubbing period.

DESCRIPTION OF THE PREFERRED EMBODIMENT

Figure 1:
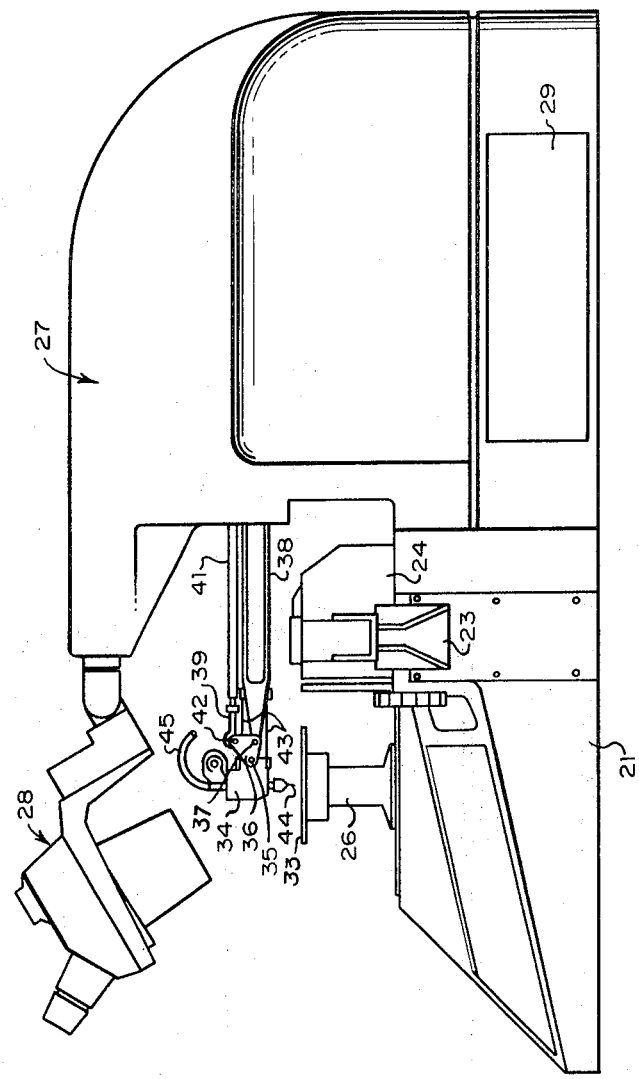
FIGS. 1 and 2 are side and front views, respectively, of a die bonder that may be adapted for automatically scrubbing dice at the bonding position according to the preferred embodiment of this invention.
Figure 2:
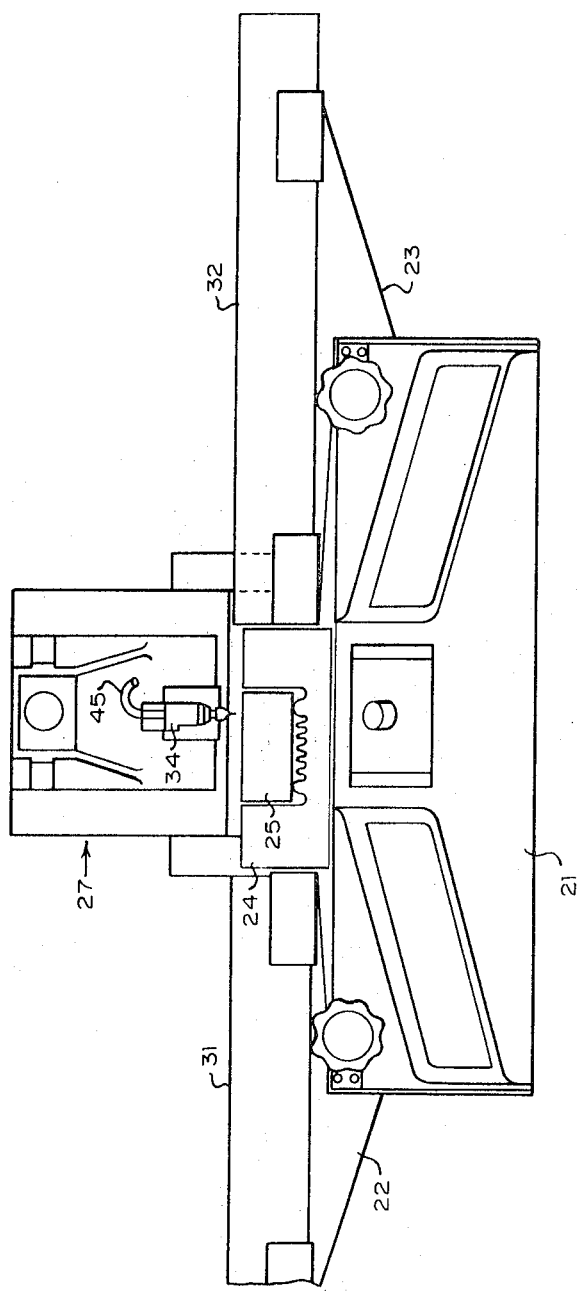

Referring now to FIGS. 1 and 2, there is shown a die bonder comprising a main base 21 supporting left and right hand transistor strip magazine holders 22 and 23, respectively, a transistor strip indexing mechanism 24, a heater unit 25, a wafer holding pedestal 26, a reciprocating mechanism unit 27, a microscope 28 and an electronic logic control compartment 29. A magazine 31 containing ten transistor strips and an empty magazine 32 are placed by the operator in the left and right hand transistor strip magazine holders 22 and 23, respectively. At the start of a bonding operation, the first transistor strip is fed by the operator onto the indexing mechanism. The operator observes all of the dice of a semiconductor wafer lying on a top plate 33 of wafer holding pedestal 26 through microscope 28 and controls the stopping and starting of the die bonder while feeding each of the die on top plate 33 under a pick-up mechanism of the die bonder. So long as each die is picked up in turn without a miss and carried to a bonding position on heater unit 25 of transistor strip indexing mechanism 24, the operator will maintain the machine in an "operate" mode.

The pick-up mechanism of the die bonder comprises a vacuum quill assembly housing 34 pivotally connected by a pin 35 to a bell crank 36, which is pivotally mounted by a pin 37 on the outer end of a ram arm 38 and also coupled to end 39 of a push rod 41 by a pivot pin 42. The vacuum quill assembly housing 34 is movably affixed to the end of the ram arm by a pair of parallel, flexible leaf springs or reeds 43, which permit vertical movement of vacuum quill assembly housing 34 on the end of ram or transfer arm 38 under control of the lateral motion of push rod 41. Vacuum quill assembly housing 34 carries a hollow capillary tube 44 coupled via a vacuum hose 45 to a vacuum valve operable to apply a vacuum to capillary tube 44 to pick-up and hold a die on the end of the capillary tube while the vacuum quill assembly housing is moved on the end of ram arm 38 to the bonding position on heater unit 25 of transistor strip indexing mechanism 24.

Figures 3, 4:
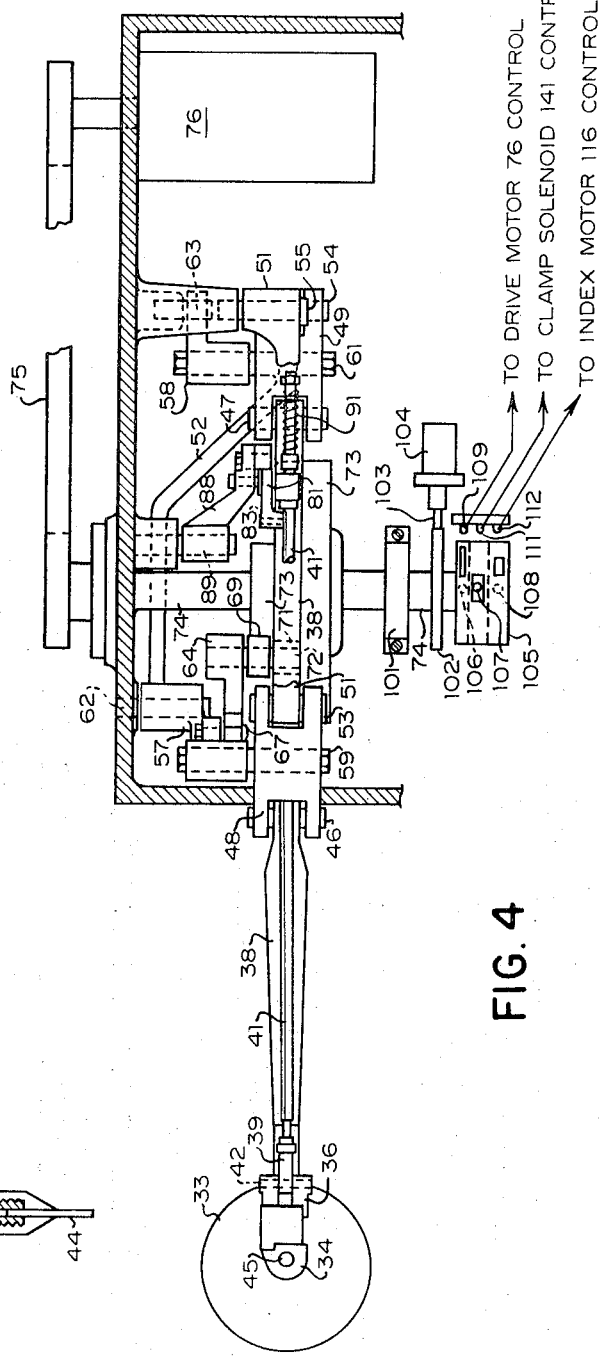
FIG. 3 is a view partly in cross-section of the vacuum quill assembly employed in the die bonder of FIGS. 1 and 2.
FIGS. 4, 5, and 6 are top, side, and front views, respectively, of the reciprocating mechanism utilized in the die bonder of FIGS. 1 and 2 to transport a die from a loading pedestal to a bonding block.

As shown in more detail in FIG. 3, the vacuum quill assembly housing comprises a tubular quill 34' with a capillary tube 44 secured in the end thereof. Quill 34' slides vertically in a bushing 34", the quill being urged in a downward direction so as to exert pressure on the die against the transistor strip in the bonding position by means of a spiral spring 40 mounted on vacuum quill assembly housing 34. The outer end of spiral spring 40 engages a collar 40' affixed to quill 34'.

Figure 5:
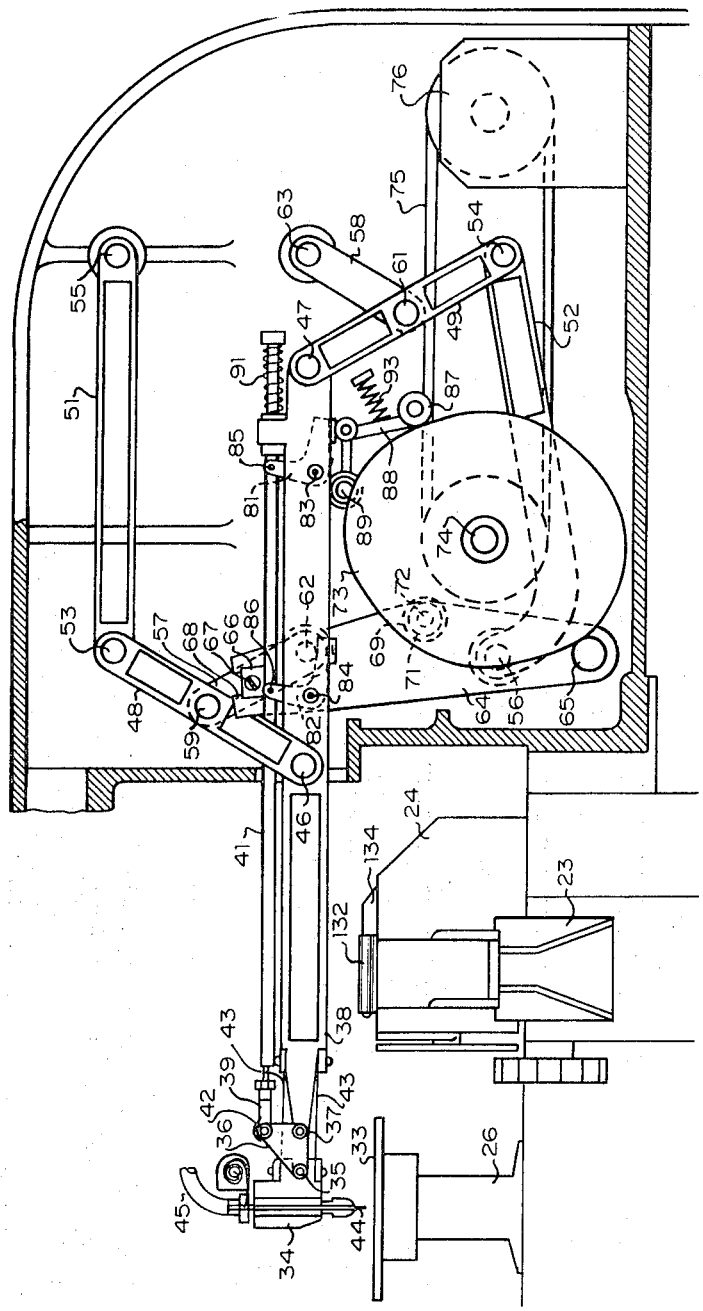

As shown in FIGS. 4 and 5, ram or transfer arm 38 is supported by a pair of linear motion imparting mechanisms comprising a pair of yoking links 48 and 49 pivotally coupled at one end to the ram arm by pins 46 and 47, respectively, and pivotally coupled at the other end to one end of upper and lower compensating links 51 and 52 by pins 53 and 54, respectively. Upper and lower compensating links 51 and 52 are pivotally affixed at their other end to the main frame of the die bonder by pivot shafts 55 and 56, respectively. A pair of oscillating links 57 and 58 coupled at one end to the mid-position of yoking links 48 and 49 by pins 59 and 61, respectively, are pivotally affixed at the other end to the main frame of the die bonder by pivot shafts 62 and 63, respectively. This reciprocating mechanism is driven by an oscillating drive link 64 pivotally mounted at one end on the main frame of the die bonder by pivot shaft 65 and coupled at the other end to oscillating link 57 by means of a shoe 66, which is affixed to oscillating link 57 by a screw 67 and is slidably captured within a slot 68 in the end of oscillating drive link 64.

As shown in FIGS. 4–8, a cam follower comprising a larger diameter roller 69 and a smaller diameter roller 71 rotatably mounted on an eccentric roller pin 72 is affixed by roller pin 72 to oscillating drive link 64. Rollers 69 and 71 are driven by a drive cam 73 mounted on a drive shaft 74 and coupled via a belt drive 75 to a main drive motor 76. One complete revolution of drive cam 73 produces one oscillation of oscillating drive link 64, which in turn produces one oscillation of oscillating link 57 and thereby moves yoking link 48 and, hence, ram arm 38 first forward and then backward over a 4½ inches linear path. As illustrated in FIG. 9, the forward movement of ram arm 38 and vacuum quill assembly 34 is followed by a first dwell period at the loading position on top plate 33 of wafer holding pedestal 26, and the return or backward movement of the ram arm and vacuum quill assembly is followed by a second dwell period at the bonding position on the transistor strip.

During the first dwell period, the vacuum quill assembly is first lowered to pick up a die from top plate 33 of wafer holding pedestal 26 and is then raised with the die and, during the second dwell period, is lowered to deposit the die at the bonding position on the transistor strip and is then raised again. To accomplish this, two L-shaped trip dogs 81 and 82 are pivotally mounted by pins 83 and 84, respectively, on ram arm 38 in spaced-apart relationship. Trip dogs 81 and 82 each have one leg pivotally affixed to push rod 41 by pins 85 and 86, respectively, and another leg positioned for engagement with a cam follower arm. When ram arm 38 is in its forwardmost position during the first dwell period, drive cam 73 will operate upon a cam follower roller 87 to rotate an L-shaped cam follower arm 88 in a counter-clockwise direction about a pivot shaft 89, which mounts cam follower arm 88 on the main frame of the die bonder. In pivoting about shaft 89, cam follower arm 88 rotates trip dog 81 counter-clockwise about pin 83 to move push rod 41 forward on ram arm 38 against the tension of a spring 91. This causes bell crank 36 to rotate about pin 37 and lower vacuum quill assembly housing 34 so as to engage the end of capillary tube 44 with a die lying on top plate 33 of wafer holding pedestal 26. At this time, vacuum is applied to capillary tube 44 to hold the die against the end of the capillary tube while the die is transported to the bonding position. As drive cam 73 continues to rotate, cam follower arm 88 rotates back in a clockwise direction under the urging of a compression spring 93. This permits push rod 41 to move backward to its rearmost position under the urging of compression spring 91 and thereby raise vacuum quill assembly housing 34 and the die held on capillary tube 44. When ram arm 38 is in its rearmost position, vacuum quill assembly housing 34 is positioned over heater unit 25 of indexing mechanism 24 and cam follower 88 is again operated to rotate trip dog 82 counter-clockwise about pin 84. This again moves push rod 41 forward against the tension of spring 91 to lower vacuum quill assembly housing 34 and thereby move the die held on capillary tube 44 down onto the transistor strip positioned on heater unit 25. The die is thereupon bonded to the transistor strip by the application of heat and pressure.

Figure 7:
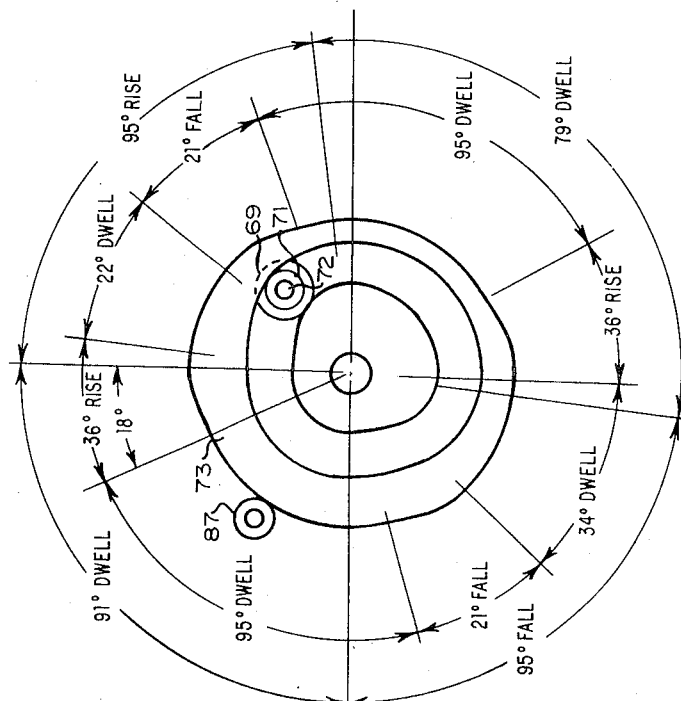
FIGS. 7 and 8 are side and cross-sectional views, respectively, of the motor-driven cam utilized in the reciprocating mechanism of FIGS. 4, 5, and 6.
Figure 8:
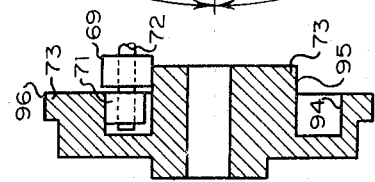
Figure 6:
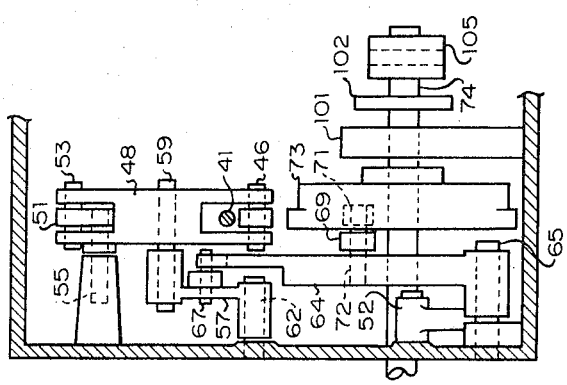
Figure 9:
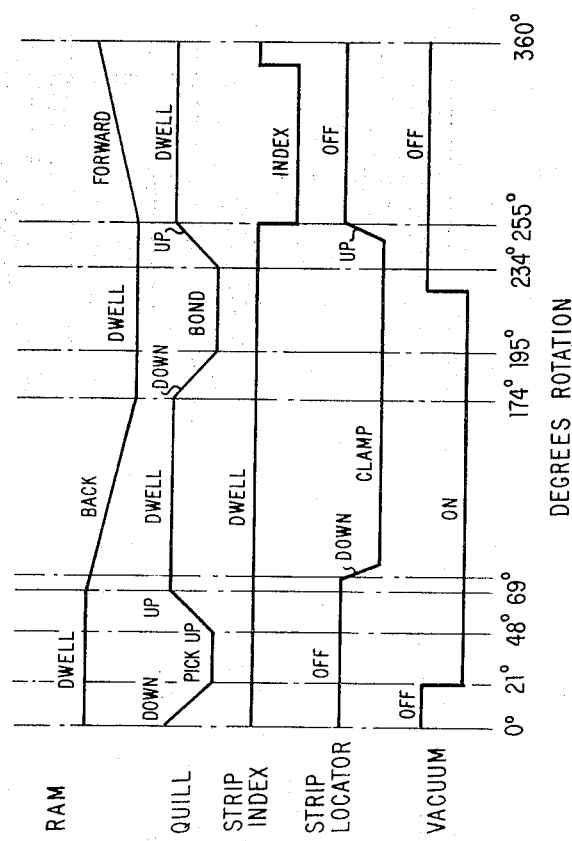
FIG. 9 is a timing diagram illustrating the operation of the die bonder of FIGS. 1 and 2.

Drive cam 73 and the three cam follower rollers 69, 71, and 87 are shown in detail in FIGS. 7 and 8. The smaller diameter roller 71 engages the upper side 94 of a groove in drive cam 73, and the larger diameter roller 69 rides on the lower side 95 of the groove. Cam follower rollers 87 mounted on cam follower arm 88 rides on the peripheral surface 96 of drive cam 73. As shown in FIGS. 4 and 6, the drive shaft 74 for drive cam 73 extends through a support bearing 101 and has another cam 102 mounted thereon. Cam 102 operates a vacuum valve 104 through a cam follower 103 to control the application of vacuum to capillary tube 44 of the vacuum quill assembly at the proper time in the die pick-up cycle. A light housing 105 is also mounted on drive shaft 74 to control the light passing from three light sources 106, 107, and 108 mounted inside the light housing to three photocells 109, 111, and 112 mounted outside the light housing. Light source 106 and photocell 109 serve to maintain the die bonder operable to the end of a complete cycle should the operator turn the machine off in the middle of the cycle, light source 107 and photocell 111 serve to operate a clamp solenoid described below, and light source 108 and photocell 112 serve to provide a start pulse to indexing mechanism 24 described below.

Figure 10:
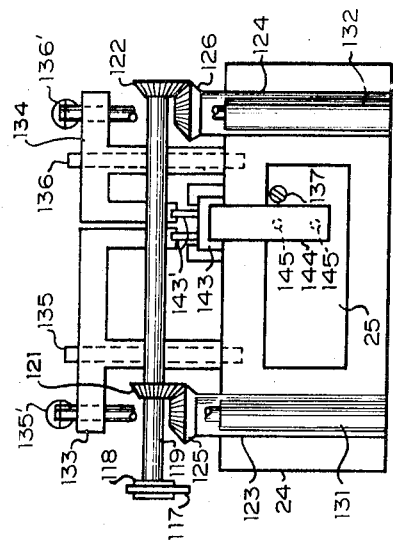
FIGS. 10 and 11 are top and front views, respectively, of a transistor strip indexing mechanism utilized in the die bonder of FIGS. 1 and 2.
Figure 11:
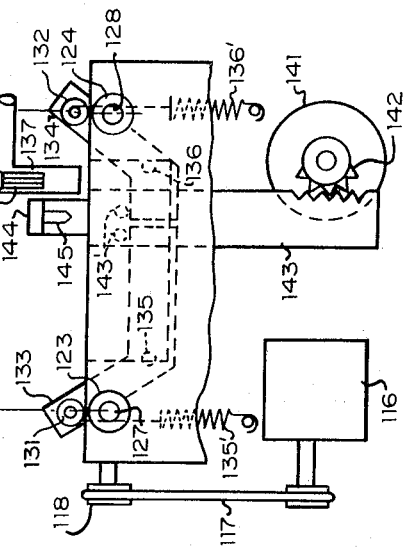

Referring now to FIGS. 10 and 11, heater unit 25 is mounted within indexing mechnism 24 and serves to support a transistor strip (not shown) to which the dice are bonded. Indexing mechanism 24 includes a stepping motor 116 coupled via a drive belt 117 and a gear pully 118 to a shaft 119 on which two miter gears 121 and 122 are mounted. Miter gears 121 and 122 serve to drive two transistor strip drive rollers 123 and 124, respectively, via two miter gears 125 and 126 mounted on two roller shafts 127 and 128. Two nip rollers 131 and 132 are mounted on two lever arms 133 and 134 pivotally mounted on two shafts 135 and 136, respectively. These nip rollers are urged against drive rollers 123 and 124 by the action of two springs 135' and 136' coupled to lever arms 133 and 134, respectively. The transistor strip is fed by the operator between drive roller 123 and nip roller 131, and drive roller 123 is driven by stepping motor 116 until a strip of reflecting material on the transistor strip passes under the end of a fiber optic bundle 137. This fiber optic bundle comprises an inner fiber optic bundle and an annular outer fiber optic bundle surrounding the inner fiber optic bundle. Light reflected through the annular outer fiber optic bundle from the strip of reflecting material on the transistor strip signals the presence of the transistor strip at the bonding position, and the die bonder is thereupon energized to start the die pick-up and transport cycle. The inner fiber optic bundle is employed to detect an indexing hole in the strip of reflecting material on the transistor strip as the transistor strip moves across heater unit 25. Presence of an indexing hole under the inner fiber optic bundle signals stepping motor 116 to stop and thereby bring the transistor strip to rest. A short time later, clamping solenoid 141 is operated from light source 107 and photocell 111 to rotate pinion 142, which, through a pinion and rack arrangement, lowers slide 143 to lower locating and clampling arm 144 down onto the transistor strip. This holds the transistor strip clamped down on heater unit 25 during the die bonding. When slide 143 first starts moving downward, integral pins 143' engage the inner ends of the two lever arms 133 and 134, which thereupon pivot about shafts 135 and 136, respectively, to raise nip rollers 131 and 132 up off the transistor strip so that the transistor strip is no longer held between the sets of rollers. As slide 143 and, hence, locating and clamping arm 144 continue moving downward, two pins 145 in the locating and clamping arm engage two indexing holes in the transistor strip and serve to precisely align the bonding point on the transistor strip under capillary tube 44 of the vacuum quill assembly just before the transistor strip is firmly clamped by the locating and clamping arm.

Figure 12:
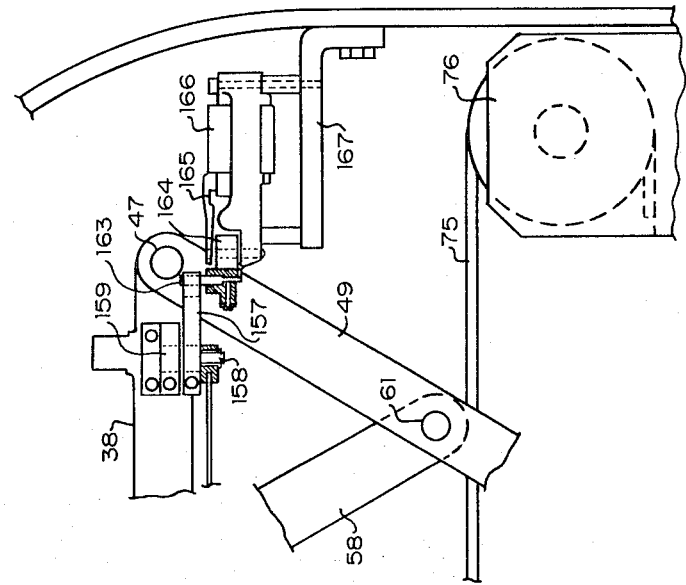
FIGS. 12 and 13 are side and top views, respectively, of the die bonder of FIGS. 1 and 2 as adapted for automatically scrubbing dice at the bonding position according to the preferred embodiment of this invention.
Figure 12:
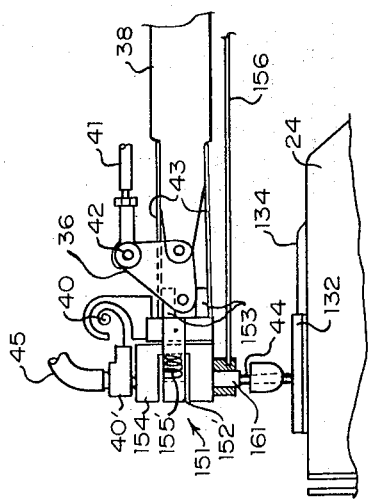
Figure 13:
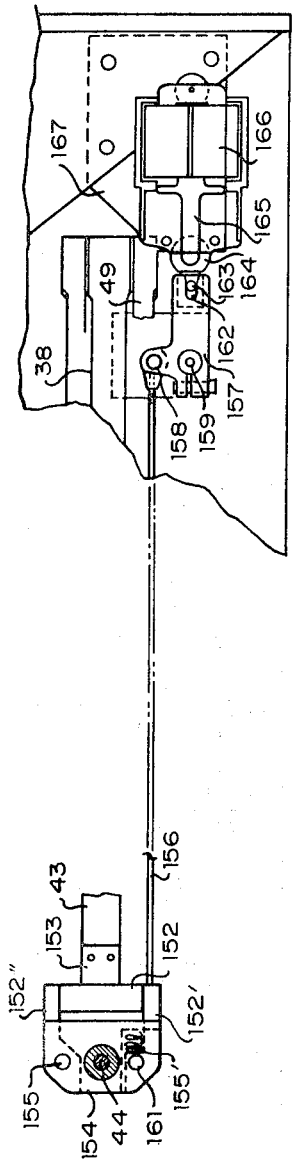

To improve the bond of the die to the transistor strip, especially where the die is of a relatively large surface area and where voids in the bonding surface between the die and transistor strip are to be prevented, an automatically operated die scrubbing mechanism may be incorporated in the die bonder. This automatic die scrubbing mechanism and those parts of the die bonder of FIGS. 1–11 necessary to understand the operation of the die scrubbing mechanism are illustrated in FIGS. 12 and 13.

The die scrubbing mechanism comprises an oscillatory form of vacuum quill housing 151 utilized in lieu of the quill housing 34 of FIG. 3. Quill housing 151 is made in two sections, a U-shaped mounting section and an oscillatory section 154. The U-shaped mounting section comprises a base section 152 and leg portions 152' and 152'', is coupled to the bell crank 36, and is mounted on the two leaf springs 43 at the end of the ram arm 38 by means of integral lips 153 extending from the base section 152. Oscillatory section 154 carries the quill 44 in a central portion thereof and is pivotally mounted on one leg portion 152'' of the mounting section 152 by a pivot pin 155 so that the oscillatory section and, hence, the quill may rotate about pivot pin 155. A compression spring 155' is mounted within a recess in quill housing 151 and extends between an inner surface of leg portion 152' of the U-shaped mounting section and an inner surface of oscillatory section 154. This spring urges the oscillatory section into a single "home" or "at rest" position on the stationary U-shaped mounting section.

A drive rod 156 is coupled at one end to an oscillatory link 157 by a pivot pin 158. Oscillatory link 157 is in turn mounted by a flexible rotary bearing 159 on the ram arm 38. The other end of drive rod 156 is coupled to the underside of oscillatory section 154 of the quill housing by a pivot pin 161. Oscillatory link 157 is provided with an open-ended slot 162 for mating with a pin 163 affixed to an oscillatory coupler 164 mounted on the end of an oscillatory drive member 165 of a vibratory motor 166. The vibratory motor motor 166 is securely affixed to a mounting plate 167, which is in turn bolted to the rear wall of the main housing of the die bonder.

In operation, with ram arm 38 and quill 44 in the forward die pick-up position, oscillatory link 157 is decoupled from pin 163 so that the die bonder operates to pick-up a die and carry it to the bonding position as described above. When the ram arm and the quill reach the bonding position, as shown in FIGS. 12 and 13, slot 162 in oscillatory link 157 carried by ram arm 38 slips onto pin 163. The vibratory motor 166 is thereafter energized to commence vibrating oscillatory drive member 165 at about 120 cps. The oscillatory link vibrates about bearing 159 and imparts a to-and-fro linear motion to drive rod 156, which causes oscillatory section 154 of the quill housing to oscillate at about 120 cps against the force of spring 155', thereby scrubbing the die down onto the transistor strip for a better bonding action. The distance of the scrubbing motion is variable from 0 to ± 30 thousandths of an inch.

Figure 14:
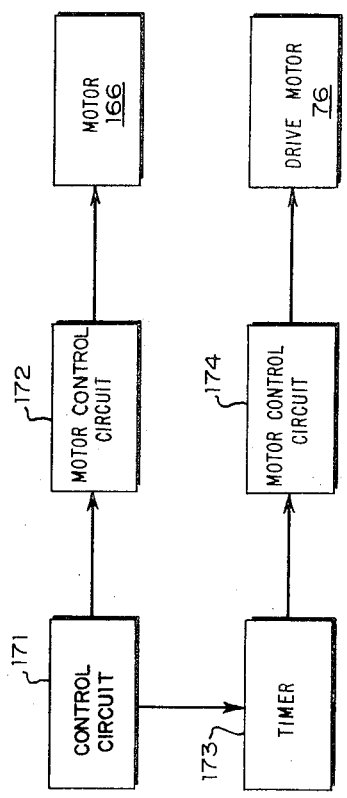
FIG. 14 is a block diagram illustrating the timing control apparatus for the scrubbing mechanism of FIGS. 12 and 13.

Referring now to FIG. 14, the control circuit 171 for activating the vibratory motor 166 comprises an additional light source within the light housing 105 on the drive shaft 74 and an additional photocell mounted outside the light housing and activated by this additional light source through a slot in the light housing when the die bonder is in the bonding position. This cam-like control circuit 171 activates a motor control circuit 172 to energize the vibrating motor 166, which thereafter remains activated until the light from the additional light source of control circuit 171 is cut off from the additional photocell of control circuit 171 by light housing 105 as drive shaft 74 continues to rotate. The scrubbing action takes place for about 60 milliseconds at the maximum die bonding speed and longer at slower die bonding speeds.

If the operator desires a longer scrubbing time, a timer 173 is provided that may be set by the operator to give up to a four second scrubbing time. In operation, when control circuit 171 operates to start the scrubbing action, timer 173 activates the motor control circuit 174 to de-energize the main drive motor 76 for a desired short period of time to cause the die bonder to dwell at the bonding position. After expiration of this short additional time period, timer 173 reactivates motor control circuit 174 to again energize drive motor 76 for the next operating cycle of the die bonder. Timer 173 provides variable times of motor interruption under the control of the operator.

What is claimed is:

1. Apparatus for picking up an object at a pick-up position and transporting it to a delivery position, said apparatus comprising:
   pick-up means for picking up the object;
   a transfer arm for carrying said pick-up means at one end thereof;
   first drive means for moving said transfer arm and pick-up means in a straight line between the pick-up and delivery positions, said first drive means comprising first and second linkage mechanisms each pivotally coupled at one end to said transfer arm and pivotally mounted at the other end at a fixed position on said apparatus, an oscillatory drive link pivotally coupled at one end to one of said first and second linkage mechanisms, a cam follower mounted on said oscillatory drive link, a cam for controlling the movement of said cam follower to drive said oscillatory drive link and in turn said first and second linkage mechanisms and transfer arm, and means for rotating said cam;
   said pick-up means being mounted for vertical movement at said one end of said transfer arm and comprising a first section mounted on said transfer arm, a second section pivotally mounted on said first section for oscillatory lateral motion thereon, said second section being adapted to pick up the object; and
   second drive means for moving said second section in an oscillatory lateral motion at the delivery position, said second drive means comprising a drive rod coupled to said second section and to oscillatory drive means for imparting oscillatory motion to said drive rod to oscillate said second section at the delivery position.

2. Apparatus as in claim 1 wherein said pick-up means includes a vacuum quill mounted on said second section for picking up the object and holding it for oscillatory lateral movement with the second section at the delivery position.

3. Apparatus as in claim 2 wherein said pick-up means further includes means for urging said second section and, hence, said vacuum quill into a normal rest position.

4. Apparatus as in claim 3 wherein said last-mentioned means comprises a compression spring mounted between said first and second sections.

* * * * *

UNITED STATES PATENT OFFICE
CERTIFICATE OF CORRECTION

Patent No. 3,762,015    Dated October 2, 1973

Inventor(s) William Radobenko

It is certified that error appears in the above-identified patent and that said Letters Patent are hereby corrected as shown below:

Column 1, line 16, cancel the comma (first occurrence);

Column 2, line 39, cancel "2" and substitute -- a --;

Column 7, line 17, cancel "motor" (second occurrence); and

Column 7, line 46, cancel "lhe vibrating" and substitute -- the vibratory --.

Signed and sealed this 9th day of April 1974.

(SEAL)
Attest:

EDWARD M. FLETCHER, JR.　　　　　C. MARSHALL DANN
Attesting Officer　　　　　　　　　Commissioner of Patents